United States Patent [19]

Saita et al.

[11] Patent Number: 4,644,224
[45] Date of Patent: Feb. 17, 1987

[54] COMPACT FLUORESCENT LAMP HAVING BULB BASE

[75] Inventors: Shigeaki Saita, Ome; Hiroshi Takada, Iruma; Seiichi Tairaku, Akishima, all of Japan

[73] Assignee: Hitachi, Ltd., Tokyo, Japan

[21] Appl. No.: 792,985

[22] Filed: Oct. 30, 1985

Related U.S. Application Data

[63] Continuation of Ser. No. 501,153, Jun. 6, 1983, abandoned.

[30] Foreign Application Priority Data

Jun. 11, 1982 [JP] Japan .................. 57-99222

[51] Int. Cl.⁴ .......................................... H01J 61/34
[52] U.S. Cl. ................... 313/634; 313/493; 313/25
[58] Field of Search .............. 313/609, 611, 612, 634, 313/493, 25

[56] References Cited

U.S. PATENT DOCUMENTS

| | | |
|---|---|---|
| 2,001,501 | 5/1935 | Ruttenauer et al. ............ 313/634 X |
| 4,199,708 | 4/1980 | Lauwerijssen et al. ......... 313/612 X |
| 4,275,325 | 6/1981 | Guim ............................ 313/493 X |
| 4,441,050 | 4/1984 | Steeger et al. ...................... 313/493 |

FOREIGN PATENT DOCUMENTS 56-3962  1/1981  Japan ................................ 313/634

*Primary Examiner*—David K. Moore
*Assistant Examiner*—K. Wieder
*Attorney, Agent, or Firm*—Antonelli, Terry & Wands

[57] ABSTRACT

A low-pressure mercury vapor discharge lamp according to the invention is comprised of a large-stem composed of a flare part and a pinch part to which two pairs of lead wires are pinch-sealed, filament coils mounted between ends of the pairs of lead wires, respectively, two inner tubes each of which is pinch-sealed to the pinch part of the flare-stem with one end opened and the other end enclosing each of the filament coils and is bent in a predetermined shape, and a glass lamp envelope having an end portion sealed to the flare part for forming an air-tight space while enclosing the inner tubes.

8 Claims, 9 Drawing Figures

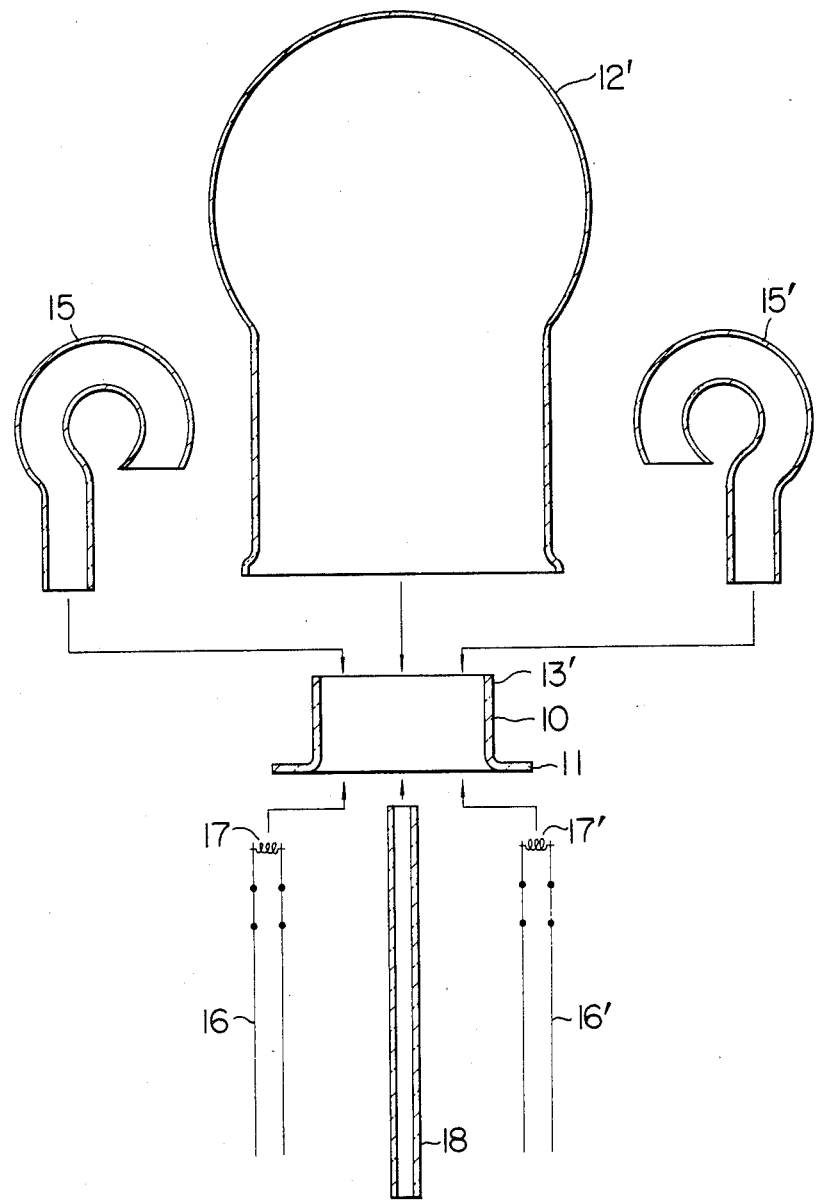

COMPACT FLUORESCENT LAMP HAVING BULB BASE

This is a continuation Ser. No. 501,153 filed June 6, 1983 now abandoned.

BACKGROUND OF THE INVENTION

The present invention relates to an improvement in a low-pressure mercury vapor discharge lamp and a method of fabricating the lamp, in which two inner tubes each having one open end and the other closed end are provided within a sealed or air-right glass lamp envelope with a single filament coil being provided inside of the closed end, and more particularly, it relates to a reduction in manufacturing cost for the lamp of this type.

Recently, various attempts have been made to produce fluorescent lamps provided with bulb bases through which the fluorescent lamps may be mounted on associated sockets to light, i.e., bulb base type fluorescent lamps.

FIG. 1 shows a fluorescent lamp of such a type, in particular, a construction of a low-pressure mercury vapor discharge lamp as disclosed in U.S. Pat. No. 4,199,708. This fluorescent lamp is comprised of a glass lamp envelope 1 sealed to a button-stem 2 to form an air-tight space therein and two U-shaped inner tubes 3, 3' each of which has one end adhered to the button-stem 2 to be closed and the other end opened to the air-tight space (at openings 6, 6'), each inner tube being disposed within the air-tight space. Several Torrs of rare gas and a small amount of mercury are enclosed in the glass lamp envelope 1 and the filament coils 4, 4' are disposed inside of the closed ends of the two inner tubes 3, 3'. Discharge is generated between the two filament coils 4, 4' and ultraviolet rays generated from plasma within the inner tubes 3, 3' are converted into visible lights by phosphor layers 5, 5' coated on inner wall surfaces of the inner tubes 3, 3'. A light-dispersing material layer 9 is applied to an inner surface of the glass lamp envelope 1. A starting circuit is enclosed in a case 7 one end of which is provided with a bulb base 8.

The thus constructed fluorescent lamp is characterized in that since the spaces inside of the inner tubes 3, 3', which are luminescent parts, are in communication with the space inside of the glass lamp envelope 1, a mercury vapor pressure in the inner tubes 3, 3', on which a lamp efficiency depends, is determined by a temperature at a cold spot of the glass lamp envelope 1. As a result, it is avantageous that a high power may be obtained without any reduction in efficiency.

However, in the above-described fluorescent lamp, since a discharge path is elongated to enhance the lamp efficiency, the button-stem 2 is used as its stem. In the case where such a button-stem 2 is used in the fluorescent lamp, the following disadvantages are encountered.

(i) It is very difficult to fabricate the button stem 2 of the large diameter, in which lead wires are embedded.

(ii) Since the inner tubes 3, 3' are attached to the button stem 2 by adhesives, the adhering process is time-consuming.

(iii) Since the inner tubes 3, 3' are held on the button-stem by adhesives, a mechanical strength against a collision or the like is small.

As a result, the fabricating cost is increased and reliability is decreased. Therefore, there have been strong demands to overcome these disadvantages, in mass-production of the fluorescent lamps.

SUMMARY OF THE INVENTION

Accordingly, an object of the invention is to provide a low-pressure mercury vapor discharge lamp which is easy to fabricate with a high reliability and a method of fabricating the same.

According to the present invention, there is provided a low-pressure mercury vapor discharge lamp comprising a flare-stem composed of a flare part and a pinch part to which two pairs of lead wires are pinch-sealed, filament coils mounted between ends of the pairs of lead wires, respectively, two inner tubes each of which is pinch-sealed to the pinch part of the flare-stem with one end opened and the other end enclosing each of the filament coils, and is bent in a predetermined shape, and a glass lamp envelope having an end portion sealed to the flare part for forming an air-tight space while enclosing the two inner tubes.

According to another aspect of the invention, there is provided a method of fabricating a low-pressure mercury vapor discharge lamp, comprising the steps of positioning in a predetermined relationship one end of each of two inner tubes each having both ends bent within a cylindrical part of a flare-stem composed of a flare part and the cylindrical part, one end of an exhaust tube and two pairs of lead wires for mounting filament coils, uniformly eating and softening portions of the cylindrical part, the inner tubes and the exhaust tube to be sealed to each other, pinch-sealing the cylindrical part for simultaneously pinch-sealing the cylindrical part, the inner tubes, the exhaust tube and the lead wires, and sealing the end of the glass lamp envelope to the flare part for forming an air-tight space by enclosing the inner tubes.

According to the feature of the lamp construction and the fabricating method of the present invention, a flare-stem is used instead of the conventional button stem, and the inner tubes, the exhaust tube and the lead wires are positioned within the cylindrical portion of the flare-stem and then these members are simultaneously pinch-sealed whereby the fabricating steps are extremely simplified. Since the inner tubes are pinch-sealed to the flare-stem, a mechanical strength against a collision or the like may be enhanced. Furthermore, since the flare-stem is normally used in manufacturing fluorescent lamps, although a diameter of the flare-stem is increased, any difficulty would not be caused in the manufacturing process.

As a result, it is possible to provide a low-pressure mercury vapor discharge lamp at a low cost and with a high reliability.

BRIEF DESCRIPTION OF THE DRAWINGS

FIG. 3 is a view showing an arrangement of respective components constituting the discharge lamp shown in FIG. 2;

DETAILED DESCRIPTION OF THE PREFERRED EMBODIMENTS

Figure 1:
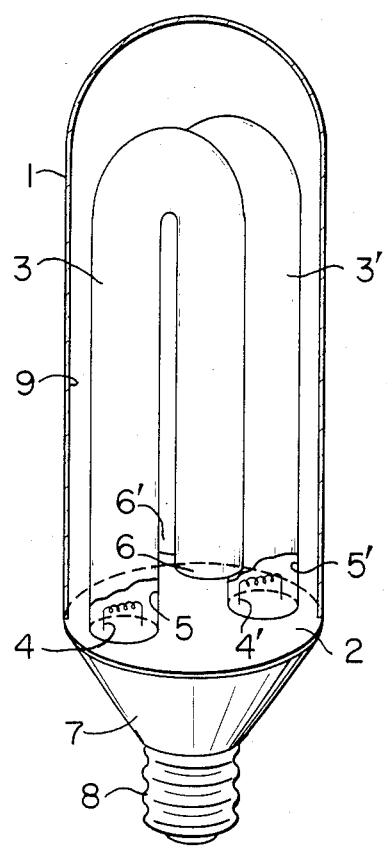
FIG. 1 is a view showing a construction of a conventional low-pressure mercury vapor discharge lamp.
Figure 2:
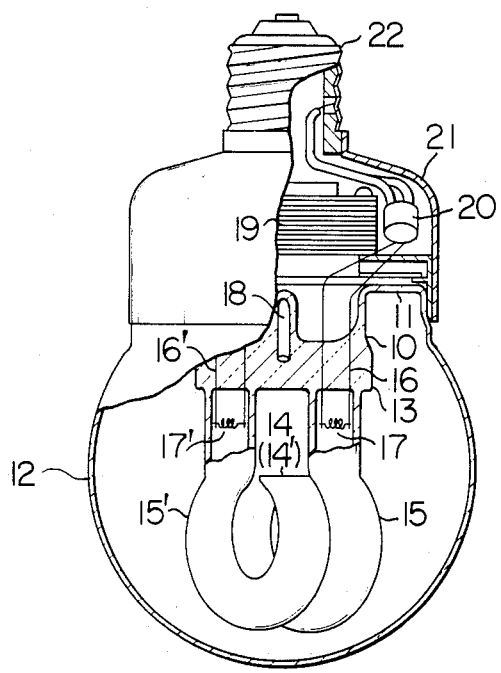
FIG. 2 is a view of a construction of a low-pressure mercury vapor discharge lamp according to the invention.

FIG. 2 shows a basic construction of a low-pressure mercury vapor discharge lamp according to the present invention. This fluorescent lamp is composed of a glass lamp envelope 12 which is sealed to a flare part 11 of a flare-stem 10 to thereby form an air-tight space therein and two inner tubes 15, 15' each of which is located within the glass lamp envelope 12 and is formed in a question-mark shape, one end of each inner tube being pinch-sealed to a pinch part 13 of the flare-stem 10 and the other end being opened to the above-described air-tight space at an opening end 14, 14'. Two pairs of lead wires 16, 16' are sealed in the pinch part 13 and extend to the ends of the inner tubes 15, 15'. Between the end tips of each pair of the lead wires 16, 16' is connected a filament coil 17, 17' to which an electron emitter material is coated. Also, an exhaust tube 18 tipped-off at its upper end is pinch-sealed at the pinch part 13.

Then, a phosphor layer (not shown) is applied to an inner wall surface of each inner tube 15, 15' and a light-dispersing material layer (not shown) is applied to an inner wall surface of the glass lamp envelope 12. Elements forming a starting circuit, such as choke coil 19, glow lamp 20 and a noise reduction condenser (not shown) are enclosed is a case 21. A bulb base 22 is counted on an end of the case 21. The other end of the case 21 is fastened to the end of the glass lamp envelope 12 by fitting means or the like. Also, several Torrs of rare gas and a small amount of mercury are sealed in the glass lamp envelope 12.

The light operation of the above-described fluorescent lamp is the same as that of the conventional fluorescent lamp. In the same way as in the conventional fluorescent lamp, a discharge passage is formed between the filament coils 17, 17'. However, the discharge passage is formed in the glass lamp envelope 12 between the opening end 14 of the inner tube 15 and the opening end 14' of the inner tube 15'. An ultraviolet ray generated from the discharge plasma is converted into a visible light by the phosphor layer applied on the inner wall surfaces of the inner tubes 15, 15'. The visible light is dispersed to a desired extent by the light-dispersing material layer formed on the inner wall surface of the glass lamp envelope 12, thereby projecting the outside of the glass lamp envelope 12.

The thus constructed fluorescent lamp is characterized in that in addition to its inherent advantage that a high power may be obtained without any reduction in efficiency, since the inner tubes 15, 15' are pinch-sealed and firmly fastened to the pinch part 13 of the flare-stem 10, there is a sufficient resistance against an outside force such as a collision. Moreover, with such a flare-stem construction, the fabricating process may be extremely simplified.

Finally, the inner tubes of a question-mark shape of the present invention have a discharge path length which may be increased by 7% as compared with the U-shaped inner tubes of the prior art, assuming that the envelope of the lamp of the present invention has the same height as that of the envelope of the prior art. Consequently, there can be provided a lamp which is as compact in structure, while being significantly higher in efficiency. Furthermore, since the sealed end of each of the question-mark inner tubes is located in a plane substantially passing through a center of the lamp, the manufacture of the lamp is very greatly facilitated, when a pinch process is utilized.

Subsequently, a method of fabricating the fluorescent lamp shown in FIG. 2 will be described.

FIG. 3 shows a construction and an arrangement of structural components for constituting the fluorescent lamp according to the present invention. First of all, in an arrangement order, a flare-stem 10 made of lead glass and composed of a cylindrical part 13' and a flare part 11 (64 mm in outer diameter) is located at a predetermined position. Subsequently, two pairs of lead wires 16, 16' which are connected at their ends by filament coils 17, 17' (which may be, alternatively, connected to the lead wires in a later step) are located in the cylindrical part 13' in a side-by-side relation on the right and left sides of an exhaust tube 18 made of lead glass. Finally, inner tubes 15, 15' are each 140 mm long in overall length, about 14 mm large in outer diameter and formed in a question-mark shape. These tubes are made of lead glass and the inner wall surface of each tube is provided with a phosphor layer. The inner tubes are located in the cylindrical part 13' of the flare stem 10 as that their end portions each surround one of the filament coils 17, 17'.

Figure 4A:
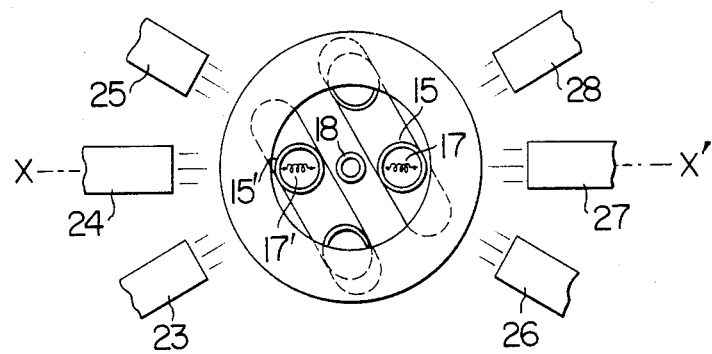
FIGS. 4A and B are plan and elevation views of the discharge lamp for illustrating a heating step.
Figure 4B:
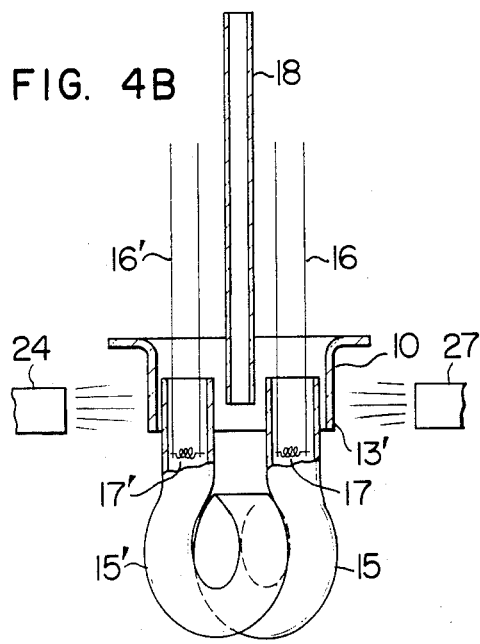

FIGS. 4A and 4B are plan and elevation views of the arrangement after the inner tubes 15, 15', the exhaust tube 18 and the lead wires 16, 16' are located on the flare-stem 10. It should be noted that as shown in FIG. 4A, the filament coils 17, 17', the exhaust tube 18 and the inner tubes 15, 15' are aligned with an axis x-x' in a linear relationship, and after the location, in order to soften these components, the flare-stem 10, the inner tubes 15, 15' and the lead wires 16, 16' are rotated about the exhaust tube 18 while keeping a predetermined interval and predetermined portions of these components are heated by gas burners 23 to 28 at about 1,100° C. to uniformly soften them.

Figure 5A:
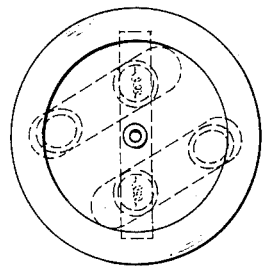
FIGS. 5A, B and C are plan, elevation and side elevation views of the discharge lamp for illustrating a pinch-sealing step.
Figure 5B:
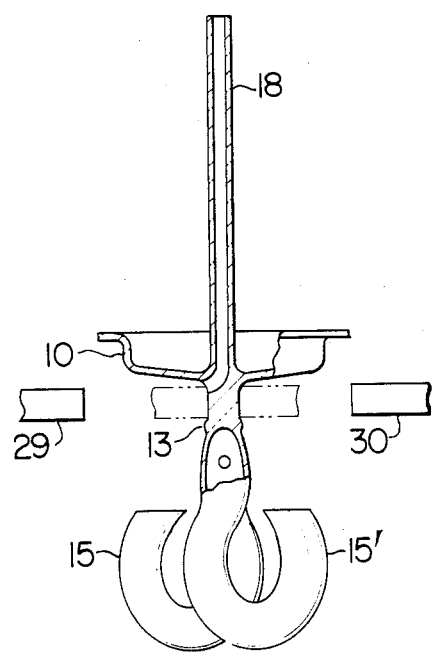
Figure 5C:
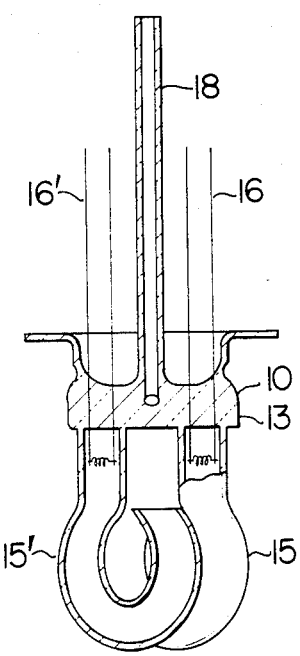

Subsequently, by pinchng the cylindrical part 13' by pinchers 29 and 30 from the right and left sides of the cylindrical part 13', the inner tubes 15, 15', the exhaust tube 18 and the lead wires 16, 16' are simultaneously pinch-sealed to the flare-stem 10 to form a mount. This operation is shown in FIGS. 5A, 5B and 5C. FIG. 5B is an elevation view showing the condition in which the pinch-seal is achieved by the pinchers 29 and 30 to thereby form a pinch portion 13, FIGS. 5A and 5B being plan and side elevation views in this case.

Figure 6:
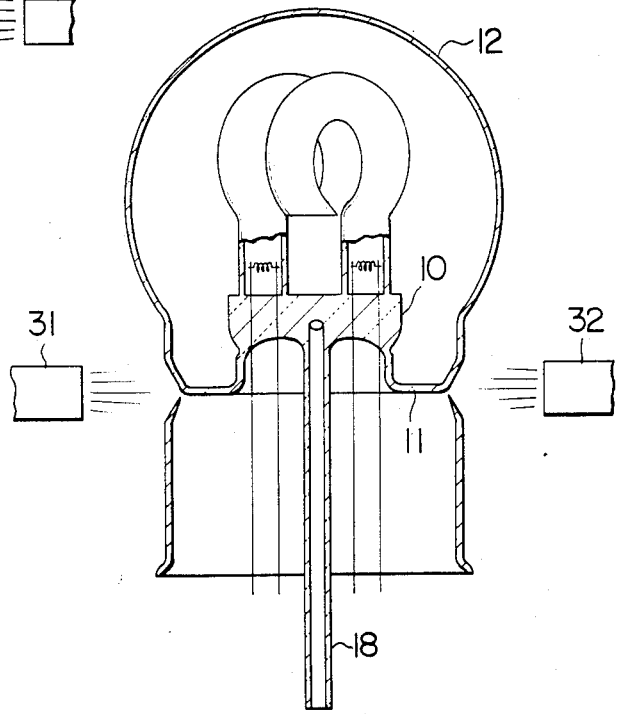
FIG. 6 is an elevation view of the discharge lamp for illustrating a sealing step of a glass lamp envelope.

After forming the mount in such a manner, as shown in FIG. 6, the glass lamp envelope 12' (made of soda glass having a diameter of 90 mm) shown in FIG. 3 is located on the flare part 11 of the flare-stem 10, and the glass lamp tube 12' and the mount are heated and softened by gas burners 31 and 32 while being roated, so that the glass lamp envelope 12 is sealed to the flare part 11.

Thereafter, an exhaust is carried out through the exhaust tube 18 and then mercury and rare gas are enclosed and then the exhaust tube 18 is sealed.

Finally, the case 21 is provided with bulb base and the starting circuit is fitted to the end of the glass lamp envelope 12 to thereby finish the low-pressure mercury discharge lamp according to the present invention as shown in FIG. 2.

The most notable feature of the above-described method is that the inner tubes, the exhaust tube and the lead wires are arranged in the flare-stem by using the flare-stem, and after heating, these components are simultaneously pinch-sealed to extremely simplify the processes.

As has been described above, according the present invention, it is possible to provide a low-pressure mercury vapor discharge lamp at a low cost and with a high reliability.

What is claimed is:

1. A low-pressure mercury vapor discharge lamp comprising:
    a stem through which two pairs of lead wires extend;
    first and second filament coils connected respectively to said pairs of lead wires on one side of said stem;
    two inner tubes each having the shape of a question mark including a part circular body portion and an extending leg portion, the leg portion of each inner tube having an end which is sealed to said stem with a respective one of said filament coils extending therein and said part circular body portion having an open end; and
    a glass lamp envelope sealed to said stem to form an air-tight space while enclosing said inner tubes therein.

2. A low-pressure mercury vapor discharge lamp according to claim 1, wherein the ends of said inner tubes are sealed to said stem in common plane substantially passing through the center axis of said glass lamp envelope.

3. A low-pressure mercury vapor discharge lamp comprising:
    a flare-stem having a flare part and a pinch part through which two pairs of lead wires extend;
    filament coils mounted between the ends of said pairs of lead wires, respectively;
    two inner tubes bent in a predetermined shape, said inner tubes being pinch-sealed, together with said lead wires, to said pinch part of said flare-stem so that each of said inner tubes has one end opened and the other end enclosing the associated filament coil; and
    a glass lamp envelope having an end portion sealed to the flare part for forming an air-tight space while enclosing said inner tubes therein;
    wherein each of said inner tubes is shaped generally in the form of a question mark having a part circular body having one end forming said one opened end of the inner tube and a leg having one end forming said other end of the inner tube and the other end being integrally connected to the other end of said part circular body so as to extend outwardly therefrom.

4. A low pressure mercury vapor discharge lamp as claimed in claim 3, wherein the pinch-sealed end of each of the inner tubes is sealed to said pinch part in a plane substantially passing through the center axis of the lamp.

5. A low-pressure mercury vapor discharge lamp comprising:
    a flare-stem having a flare part and a pinch part to which two pairs of lead wires are pinch-sealed;
    filament coils mounted between ends of said pairs of lead wires, respectively;
    two inner tubes each bent in a question-mark shape having one curved section with an open end and one curved leg with a sealing end, each of said sealing ends being pinch-sealed to said pinch part in a plane substantially passing through a center axis of said lamp so as to enclose the associated filament coil; and
    a glass lamp envelope having an end portion sealed to the flare part for forming an air-tight space while enclosing said inner tubes therein.

6. A low-pressure mercury vapor discharge lamp comprising:
    a stem through which two pairs of lead wires extend;
    first and second filament coils connected respectively to said pairs of lead wires on one side of said stem;
    two inner tubes each having the shape of a question mark including a part circular body portion having both open ends and extending so as to have an angular extent of at least 180 degrees, a substantially straight leg portion having both open ends, and a curved connecting portion integrally connecting one of the open ends of said part circular body portion and one of the open ends of said leg portion to each other in a continuously curved manner, said leg portion extending from said curved connecting portion away from said part circular body portion, the other end of said leg portion being sealed to said stem with a respective one of said filament coils extending therein; and
    a glass lamp envelope sealed to said stem to form an air-tight space while enclosing said inner tubes therein.

7. A low-pressure mercury vapor discharge lamp comprising:
    a flare-stem having a flare part and a pinch part through which two pairs of lead wires extend;
    filament coils mounted between the ends of said pairs of lead wires, respectively;
    two inner tubes bent in a predetermined shape, said inner tubes being pinch-sealed, together with said lead wires, to said pinch part of said flare-stem so that each of said inner tubes has one end opened and the other end enclosing the associated filament coil; and
    a glass lamp envelope having an end portion sealed to the flare part for forming an air-tight space while enclosing said inner tubes therein;
    wherein each of said inner tubes is shaped generally in the form of a question mark having a part circular body having one end forming said one open end of the inner tube and the other end open, said part circular body extending so as to have an angular extent of at least 180 degrees, a substantially straight leg having one open end forming said other end of the inner tube and the other end open, and a curved connecting section integrally connecting the other open end of said part circular body and the other end of said leg to each other in a continuously curved manner, said leg extending from said curved connecting section away from said part circular body.

8. A low-pressure mercury vapor discharge lamp comprising:
    a flare-stem having a flare part and a pinch part to which two pairs of lead wires are pinch-sealed;
    filament coils mounted between ends of said pairs of lead wires, respectively;
    two inner tubes each bent in a question-mark shape having a part circular body having both ends open and extending so as to have an angular extent of at least 180 degrees, a substantially straight leg having an end sealed and the other end open, and a curved connecting section integrally connecting one of said open ends of said part circular body and the other open end of said leg to each other in a continuously curved manner, said leg extending from said curved connecting section away from said part circular body, each of said sealed ends being pinch-sealed to said pinch part in a plane substantially passing through a center axis of said lamp so as to enclose the associated filament coil; and a glass lamp envelope having an end portion sealed to the flare part for forming an air-tight space while enclosing said inner tubes therein.

* * * * *